US012798374B2

(12) United States Patent
Miyazawa

(10) Patent No.: US 12,798,374 B2
(45) Date of Patent: Nov. 17, 2026

(54) VEHICLE DISPLAY DEVICE

(71) Applicant: Yazaki Corporation, Tokyo (JP)

(72) Inventor: Tomohiro Miyazawa, Susono (JP)

(73) Assignee: Yazaki Corporation, Tokyo (JP)

( * ) Notice: Subject to any disclaimer, the term of this patent is extended or adjusted under 35 U.S.C. 154(b) by 24 days.

(21) Appl. No.: 19/088,202

(22) Filed: Mar. 24, 2025

(65) Prior Publication Data

US 2025/0319768 A1 Oct. 16, 2025

(30) Foreign Application Priority Data

Apr. 10, 2024 (JP) ................................ 2024-063413

(51) Int. Cl.

*B60K 35/10* (2024.01)
*B60K 35/23* (2024.01)
*B60K 35/81* (2024.01)

(52) U.S. Cl.

CPC .............. *B60K 35/10* (2024.01); *B60K 35/23* (2024.01); *B60K 35/81* (2024.01); *B60K 2360/119* (2024.01); *B60K 2360/146* (2024.01); *B60K 2360/162* (2024.01); *B60K 2360/166* (2024.01)

(58) Field of Classification Search

CPC ........ B60K 35/10; B60K 35/23; B60K 35/81; B60K 2360/119; B60K 2360/146; B60K 2360/162; B60K 2360/166; B60K 35/22; B60K 35/28; B60K 2360/16; B60K 2360/176

See application file for complete search history.

(56) References Cited

U.S. PATENT DOCUMENTS

| | | | | |
|---|---|---|---|---|
| 2010/0079413 A1* | 4/2010 | Kawashima | ........... | B60K 35/10<br>715/781 |
| 2018/0046369 A1* | 2/2018 | Takano | .................. | B60K 35/10 |
| 2026/0070414 A1* | 3/2026 | Noguchi | ................ | B60K 35/28 |

FOREIGN PATENT DOCUMENTS

| | | |
|---|---|---|
| JP | 2013-114647 A | 6/2013 |
| JP | 2020-107030 A | 7/2020 |

* cited by examiner

*Primary Examiner* — Thomas Ingram
(74) *Attorney, Agent, or Firm* — Banner & Witcoff, Ltd.

(57) ABSTRACT

A vehicle display device includes: a movement detection unit configured to detect a movement of a part of a body of an operator; and a design display unit configured to display, on an outside scene around a vehicle, a first design indicating a part of the body and a second design different from the first design. The design display unit changes the first design according to a detection result of the movement detection unit, and changes the second design such that the first design operates the second design.

5 Claims, 5 Drawing Sheets

VEHICLE DISPLAY DEVICE

CROSS-REFERENCE TO RELATED APPLICATION(S)

This application is based upon and claims the benefit of priority from prior Japanese patent application No. 2024-063413 filed on Apr. 10, 2024, the entire contents of which are incorporated herein by reference.

BACKGROUND

1. Field of the Invention

The present invention relates to a vehicle display device.

2. Description of the Related Art

In the related art, as a vehicle display device, those described in JP2013-114647A and JP2020-107030A have been proposed. JP2013-114647A and JP2020-107030A disclose that a display position of a pointer is moved in conjunction with a gesture operation of an operator. However, unlike an actual operation, the above-described gesture operation has no operational feeling. Therefore, there is a problem that a sense of discomfort is high, for example, how much to move a hand, how to move a hand, and the like are not known, which also leads to deterioration of convenience.

SUMMARY

The present invention is made in view of the above circumstance, and an object of the present invention is to provide a vehicle display device that reduces a sense of discomfort and improves convenience.

According to an aspect of the present disclosure, there is provided a vehicle display device including: a movement detection unit configured to detect a movement of a part of a body of an operator; and a design display unit configured to display, on an outside scene around a vehicle, a first design indicating a part of the body and a second design different from the first design, in which the design display unit changes the first design according to a detection result of the movement detection unit, and changes the second design such that the first design operates the second design.

According to the vehicle display device of the present invention, an effect of improving convenience is shown.

The present invention is briefly described above. Further, the details of the present invention can be clarified by reading a mode (hereinafter, referred to as an "embodiment") for carrying out the invention to be described below with reference to the accompanying drawings.

BRIEF DESCRIPTION OF THE DRAWINGS

The present disclosure will become more fully understood from the detailed description given hereinbelow and the accompanying drawings which are given by way of illustration only, and thus is not limitative of the present disclosure and wherein.

DETAILED DESCRIPTION OF THE INVENTION

A specific embodiment of the present invention will be described below with reference to the drawings.

Figure 1:
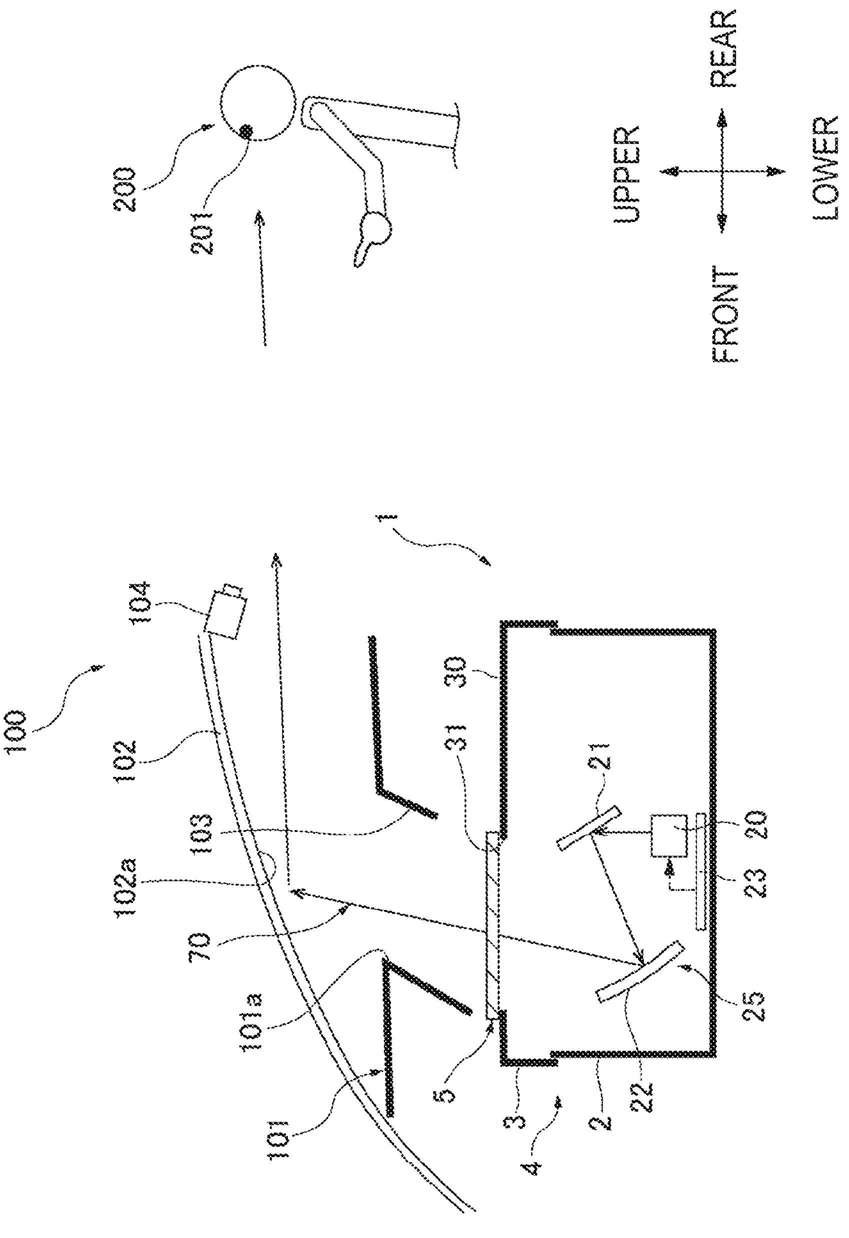
FIG. 1 is a schematic configuration diagram showing a vehicle display device according to an embodiment.

Hereinafter, for convenience of description, as shown in FIG. 1, "front", "rear", "left", "right", "upper", and "lower" are defined. A "front-rear direction", a "left-right direction", and an "upper-lower direction" are orthogonal to one another.

As shown in FIG. 1, a vehicle display device 1 of the present embodiment is mounted on a vehicle 100 and constitutes a head-up display. The vehicle display device 1 is disposed, for example, inside an instrument panel 101. The instrument panel 101 has an opening **101*a* that opens upward. The opening 101*a* faces a windshield 102 in the upper-lower direction of the vehicle 100**.

The vehicle display device 1 includes a case 4, a cover 5, an image display unit 20, a control unit 23, and an optical system 25. The image display unit 20, the control unit 23, and the optical system 25 are accommodated inside the case 4. The case 4 includes a main body 2 and a lid member 3 that engages with the body 2. The main body 2 includes an opening portion that opens upward. The lid member 3 closes the opening portion of the main body 2 from above. The lid member 3 includes a wall portion 30 that faces the opening **101*a*. The wall portion 30 has an opening 31 that opens upward. The case 4 is disposed such that the opening 31 faces the opening 101*a*. The cover 5 is a plate-shaped member that closes the opening 31 of the lid member 3. The cover 5** is made of a light-transmissive resin such as polycarbonate (PC) and acrylic.

The image display unit 20 is a device that emits display light 70 for an image. The shown image display unit 20 is a liquid crystal display device, and is, for example, a thin film transistor liquid crystal display (TFT-LCD). However, the image display unit 20 is not limited to the liquid crystal display device. The image display unit 20 may be, for example, a device that generates an image on a transmissive screen by scanning the screen with laser light.

The optical system 25 includes a first mirror 21 and a second mirror 22. The first mirror 21 reflects the display light 70 emitted from the image display unit 20 toward the second mirror 22. The first mirror 21 is, for example, a plane mirror. The second mirror 22 reflects the display light 70 toward the windshield 102. A shape of a reflection surface of the second mirror 22 is, for example, a free-form surface. The second mirror 22 is, for example, a concave mirror that enlarges the display light 70.

The display light 70 reflected by the second mirror 22 passes through the opening 31 and the opening **101*a*, and is reflected toward an operator 200, who is an occupant (for example, a driver) of the vehicle, by a reflection surface 102*a* of the windshield 102. A virtual image is formed by the display light 70 incident on pupils 201 of the operator 200. The instrument panel 101 is provided with a tubular wall portion 103. The wall portion 103 surrounds an optical path of the display light 70 from the opening 31 toward the opening 101***a*.

The control unit 23 functioning as a design display unit includes a control circuit that controls the image display unit 20. The control unit 23 is mounted on, for example, a control substrate disposed inside the case 4. The control unit 23 controls the image display unit 20 according to, for example, a program stored in advance to generate an image.

The vehicle 100 includes a movement detection unit 104. The movement detection unit 104 includes, for example, a time of flight (TOF) sensor and a camera. The movement detection unit 104 detects a movement of a hand (a position of the hand, a shape of a finger, and the like) of the operator 200 and outputs the movement to the control unit 23.

Figure 2A:
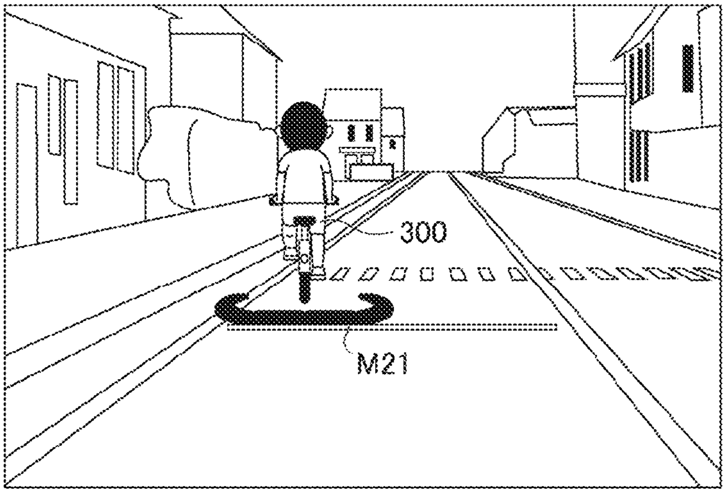
FIGS. 2A to 2C show a real image visually recognized by an operator through a windshield and a virtual image displayed by a vehicle display device 1.
Figure 2B:
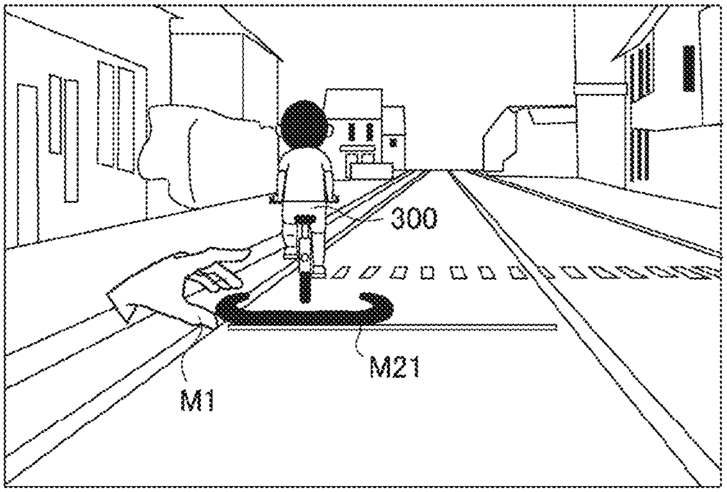
Figure 2C:
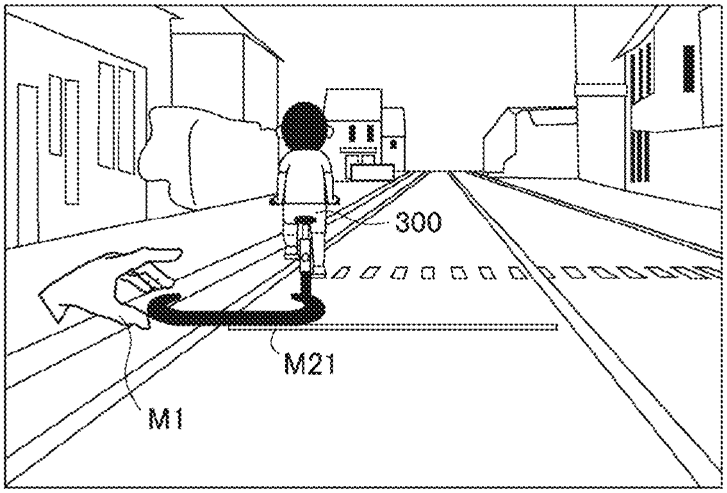

Next, an example of operations of the vehicle display device 1 having the above configuration will be described with reference to FIGS. 2A to 2C. FIGS. 2A to 2C show a real image visually recognized by the operator 200 through the windshield and a virtual image displayed by the vehicle display device 1.

The vehicle display device 1 is connected to an obstacle detection sensor (not shown) such as light detection and ranging (LiDAR). As shown in FIG. 2A, when an obstacle around the vehicle is detected by the obstacle detection sensor, the control unit 23 displays an obstacle mark M21 (second design) indicating an obstacle around an obstacle 300 (real image) on an outside scene around the vehicle visually recognized through the windshield. In the example shown in FIGS. 2A to 2C, a bicycle traveling ahead is detected as the obstacle 300. The obstacle mark M21 is a virtual image.

As shown in FIG. 2B, when a hand of the operator 200 is detected within a detection range of the movement detection unit 104, the control unit 23 displays a hand design M1 (first design) indicating the hand of the operator 200. The hand design M1 is a virtual image. The control unit 23 changes the hand design M1 in conjunction with a movement of the hand of the operator 200 detected by the movement detection unit 104.

Figure 4A:
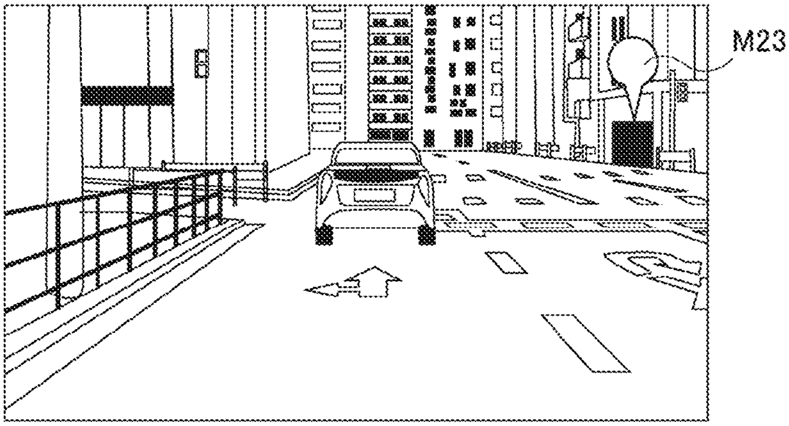
FIGS. 4A to 4C show a real image visually recognized by the operator through the windshield and a virtual image displayed by the vehicle display device 1.
Figure 4B:
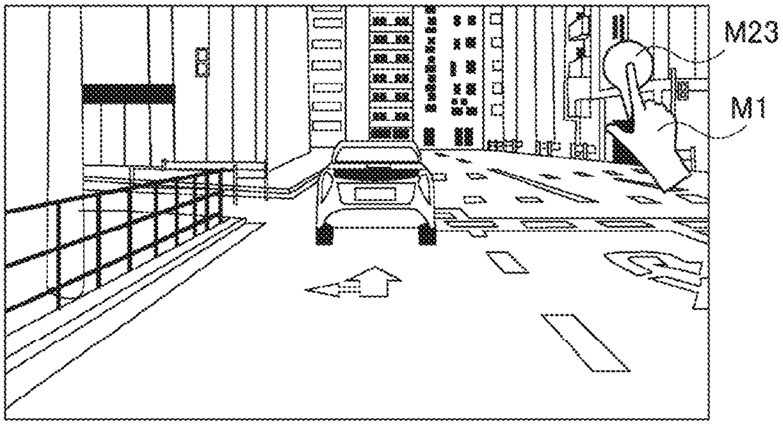
Figure 4C:
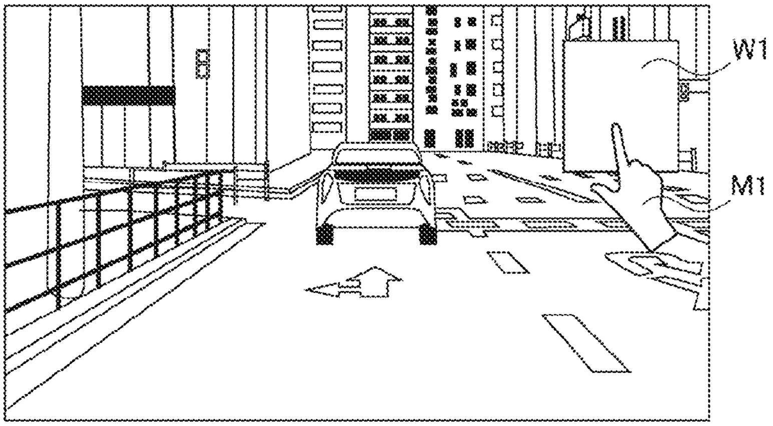

Specifically, when the hand of the operator 200 has a shape with an index finger pointed up, the control unit 23 also changes the hand design M1 to a shape with the index finger pointed up, as shown in FIGS. 4B and 4C. When the hand of the operator 200 has a shape of pinching something, the control unit 23 also changes the hand design M1 to a shape of pinching something, as shown in FIGS. 2B and 2C. That is, the control unit 23 changes the shape of the hand design M1 according to the shape of the hand of the operator 200. When the hand of the operator 200 moves in the left-right and front-rear directions, the control unit 23 also changes a display position of the hand design M1 in the left-right and front-rear directions.

When a movement of the hand of the operator 200 pinching the obstacle mark M21 to bring the obstacle mark M21 outside a display area is detected by the movement detection unit 104, the control unit 23 performs display such that the hand design M1 moves while pinching the obstacle mark M21 and moves the obstacle mark M21 outside the display area, as shown in FIG. 2C. Thereafter, the control unit 23 performs display such that the obstacle mark M21 disappears outside the display area.

As the movement of the hand of the operator 200 bringing the obstacle mark M21 outside the display area, in addition to the above-described pinching and moving movement, a movement of sweeping the obstacle mark M21 outside the display area with the index finger is considered. In this case, the control unit 23 changes the hand design M1 to a shape with the index finger pointed up, and performs display such that the hand design M1 is sweeping away the obstacle mark M21 with the index finger.

Figure 3A:
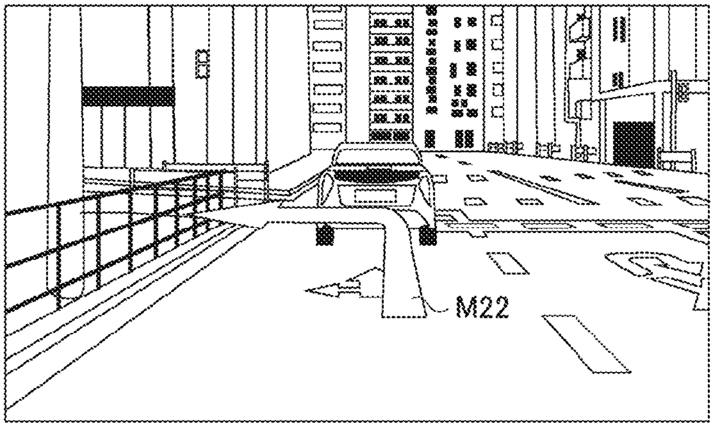
FIGS. 3A to 3C show a real image visually recognized by the operator through the windshield and a virtual image displayed by the vehicle display device 1.

Next, another example of the operations of the vehicle display device 1 having the above configuration will be described with reference to FIGS. 3A to 3C. The vehicle display device 1 is connected to a navigation device. As shown in FIG. 3A, when route guidance information is received by the navigation device, the control unit 23 displays an arrow M22 (second design) for route guidance to be superimposed on a route on the outside scene.

Figure 3B:
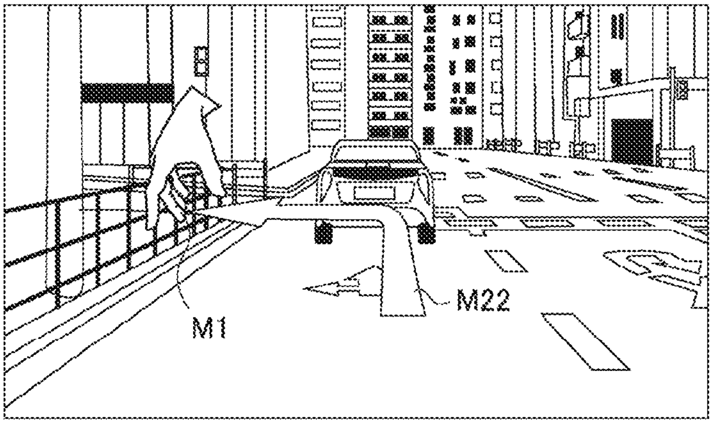

As shown in FIG. 3B, when the hand of the operator 200 is detected within the detection range of the movement detection unit 104, the control unit 23 displays the hand design M1 (first design) indicating the hand of the operator 200. The hand design M1 is a virtual image. The control unit 23 changes the hand design M1 in conjunction with the movement of the hand of the operator 200 detected by the movement detection unit 104.

Figure 3C:
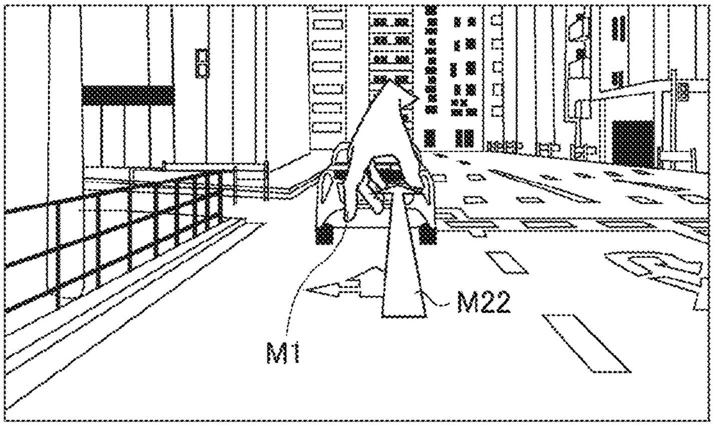

When a movement of the hand of the operator 200 pinching a tip end of the arrow M22 to change a direction of the tip end is detected by the movement detection unit 104, the control unit 23 performs display such that the hand design M1 moves while pinching the tip end of the arrow M22 to change a direction of the arrow M22, as shown in FIG. 3C. Thereafter, the control unit 23 functions as a transmission unit to transmit, to the navigation device, an instruction for changing the route to a direction of the changed arrow M22.

Next, another example of the operations of the vehicle display device 1 having the above configuration will be described with reference to FIGS. 4A to 4C. The vehicle display device 1 is connected to a navigation device, or a smartphone. In a map application of the navigation device or the smartphone, a location associated with map data is pre-registered. This location is a store, a sightseeing spot, or the like that the operator 200 or the like wants to go, and is pre-registered by operating the navigation device or the smartphone.

As shown in FIG. 4A, the control unit 23 displays a location mark M23 (second design) on a building built at a pre-registered location on the outside scene or around the building.

As shown in FIG. 4B, when the hand of the operator 200 is detected within the detection range of the movement detection unit 104, the control unit 23 displays the hand design M1 indicating the hand of the operator 200. The hand design M1 is a virtual image. The control 30 unit 23 changes the hand design M1 in conjunction with the movement of the hand of the operator 200 detected by the movement detection unit 104.

When a movement of the hand of the operator 200 pushing the location mark M23 is detected by the movement detection unit 104, the control unit 23 changes the location mark M23 such that the hand design M1 pushes the location mark M23. In the present embodiment, for example, the location mark M23 is pushed and turned off (disappears). Thereafter, a window W1 including information corresponding to the location is superimposed on the outside scene. In the window W1, a reservation screen, a congestion status, a telephone number, and the like of the location are displayed. Further, when the telephone number is touched by the hand design M1, a phone call may be made.

Similarly to the example described with reference to FIGS. 2A to 2C, the location mark M23 may be moved outside the display area by the hand design M1.

Figure 5A:
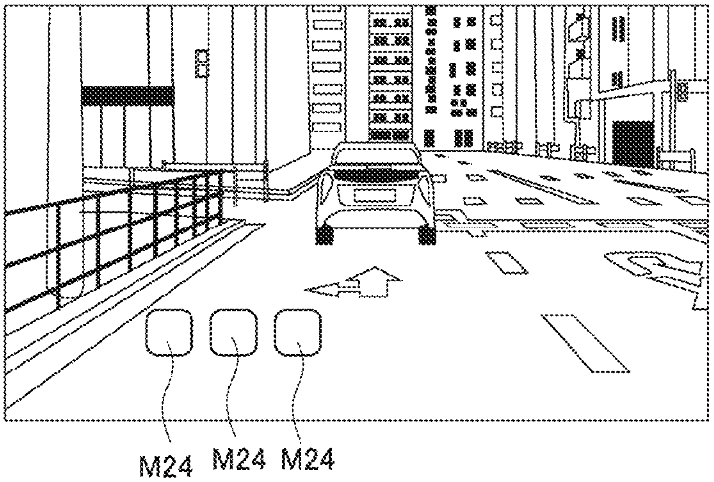
FIGS. 5A to 5C show a real image visually recognized by the operator through the windshield and a virtual image displayed by the vehicle display device 1.
Figure 5B:
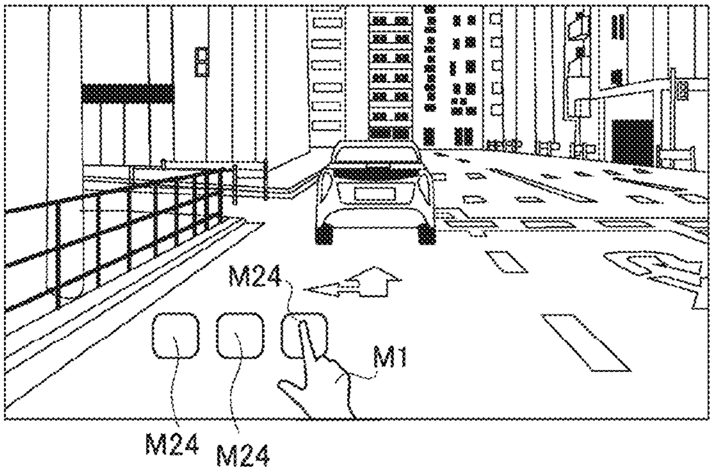
Figure 5C:
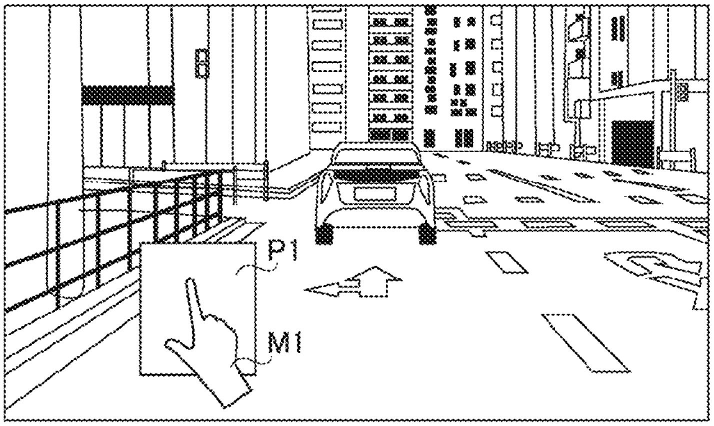

Next, an example of the operations of the vehicle display device 1 having the above configuration will be described with reference to FIGS. 5A to 5C. As shown in FIG. 5A, the control unit 23 displays a plurality of icons M24 (second design) associated with electronic devices such as a smartphone, a navigation device, and an air conditioner. Thereafter, when one of the icons M24 is touched with the hand design M1, as shown in FIG. 5B, the control unit 23 displays an operation panel P1 of the corresponding electronic device, as shown in FIG. 5C. When one of the icons M24 corresponding to the smartphone is touched, a screen the same as that of the smartphone is mirror-displayed on the operation panel P1 and can be operated by the hand design M1.

When one of the icons M24 associated with an electronic device such as the air conditioner is touched, a switch design for operating the electronic device is displayed on the operation panel P1 as the second design. The switch design displayed on the operation panel P1 can be operated by the hand design M1. When operated by the hand design M1, the switch design changes similarly to an actual switch. For example, if the switch design is a toggle switch, a rocker switch, or a push-button switch, the switch design is changed such that a direction or a position of a lever or a button is switched by the hand design M1.

Further, if the switch design is a rotary switch, the switch design is changed such that the rotary switch is rotated by the hand design M1. If the switch design is a slide switch, the switch design is changed such that a lever is slid by the hand design M1. Further, the switch design may be turned on, turned off, or changed in color by the operation of the hand design M1, instead of the physical changes.

According to the above-described embodiment, since the obstacle mark M21, the arrow M22, the location mark M23, and the icons M24 can be operated by changing the hand design M1 in the same manner as the hand, it is easy to intuitively understand how to move the hand, and convenience can be improved. Further, since the hand design Ml is displayed on the outside scene around the vehicle, the hand design M1 can be visually recognized as a part of an actual own body, and a sense of discomfort can be reduced.

According to the above-described embodiment shown in FIGS. 2A to 2C, when the movement of the hand bringing the obstacle mark M21 outside the display area is detected by the movement detection unit 104, the control unit 23 performs display such that the hand design M1 moves the obstacle mark M21 to bring the obstacle mark M21 outside the display area. Accordingly, the obstacle mark M21 can disappear outside the display area by intuitively moving the hand.

According to the above-described embodiment shown in FIGS. 3A to 3C, the control unit 23 displays, based on the route information from the navigation device, the arrow M22 for route guidance to be superimposed on the route on the outside scene, and then when the movement of the hand changing the direction of the tip end of the arrow M22 is detected by the movement detection unit 104, the control unit 23 performs display such that the hand design M1 moves the tip end of the arrow M22 to change the direction of the arrow M22, and transmits an instruction for changing the route to the navigation device. Accordingly, it is possible to change the route by intuitively moving the hand.

The present invention is not limited to the embodiments described above and can be appropriately modified, improved, and the like. In addition, materials, shapes, sizes, numbers, arrangement positions, and the like of components in the embodiment described above are freely selected and are not limited as long as the present invention can be implemented.

According to the above-described embodiment, the hand design M1 is displayed in conjunction with the movement of the hand, but the present disclosure is not limited thereto. For example, arm and hand designs may be displayed in conjunction with movements of an arm and the hand.

According to the above-described embodiment, the vehicle display device 1 displays the hand design M1, the obstacle mark M21, the arrow M22, the location mark M23, and the icons M24 which are virtual images on the outside scene which is a real image, but the present disclosure is not limited thereto. It is also conceivable to display an outside scene image around the vehicle captured by a camera on a display monitor that is being displayed in the vehicle, and display the hand design M1, the obstacle mark M21, the arrow M22, the location mark M23, and the icons M24 to be superimposed on the outside scene image.

Here, features of the embodiment of the vehicle display device according to the present invention described above are briefly summarized and listed in the following [1] to [5].

[1] A vehicle display device (1) including:

a movement detection unit (104) configured to detect a movement of a part of a body of an operator (200); and a design display unit (23) configured to display, on an outside scene around a vehicle, a first design (M1) indicating a part of the body and a second design (M21 to M24) different from the first design (M1), in which the design display unit (23) changes the first design (M1) according to a detection result of the movement detection unit (104), and changes the second design (M21 to M24) such that the first design (M1) operates the second design (M21 to M24).

According to the vehicle display device (1) having the configuration of [1], since the second design (M21 to M24) can be operated by changing the first design (M1) in the same manner as a part of the body, it is easy to intuitively understand how to move the hand, and convenience can be improved. Further, since the first design (M1) is displayed on the outside scene around the vehicle, the first design (M1) can be visually recognized as a part of an actual own body, and a sense of discomfort can be reduced.

[2] The vehicle display device (1) according to [1], in which when a movement of a part of the body bringing the second design (M21) outside a display area is detected by the movement detection unit (104), the design display unit (23) performs display such that the first design (M1) moves the second design (M21) to bring the second design (M21) outside the display area.

According to the vehicle display device (1) having the configuration of [2], the second design (M21 to M24) can disappear outside the display area by intuitively moving a part of the body.

[3] The vehicle display device (1) according to [1], in which the design display unit (23) displays, based on route information from a navigation device, an arrow (M22) for route guidance to be superimposed on a route on the outside scene as the second design, and then performs display such that the first design (M1) moves a tip end of the arrow (M22) to change a direction of the arrow (M22) when a movement of a part of the body changing a direction of the tip end of the arrow (M22) is detected by the movement detection unit (104), and the vehicle display device further includes a transmission unit (23) configured to transmit an instruction for changing the route to the navigation device when the movement of a part of the body changing the direction of the tip end of the arrow (M22) is detected by the movement detection unit (104).

According to the vehicle display device (1) having the configuration of [3], the route can be changed by intuitively moving a part of the body.

[4] The vehicle display device (1) according to [1], in which the design display unit (23) displays the second design (M23) on a building built at a pre-registered location on the outside scene or around the building, then when a movement of a part of the body operating the second design (M23) is detected by the movement detection unit (104), changes the second design (M23) such that the first design (M1) operates the second design (M23) and then displays information on the location on the outside scene.

According to the vehicle display device (1) having the configuration of [4], the information on the location associated with the second design (M23) can be displayed by intuitively moving a part of the body.

[5] The vehicle display device (1) according to [1], in which the design display unit (23) displays an icon (M24) corresponding to an electronic device as the second design, then when a movement of a part of the body operating the icon (M24) is detected by the movement detection unit (104), changes the icon (M24) such that the first design (M1) operates the icon (M24) and then displays an operation panel (P1) of the electronic device.

According to the vehicle display device (1) having the configuration of [5], the electronic device associated with the icon (M24) can be operated by intuitively moving a part of the body.

The invention claimed is:

1. A vehicle display device comprising:

a movement detection unit configured to detect a movement of a part of a body of an operator; and a display unit configured to display on a windshield of a vehicle, over a real image including an outside scene around the vehicle visible to the operator through the windshield, a first virtual image indicating a part of the body and a second virtual image different from the first virtual image, wherein the display unit changes the first virtual image according to a detection result of the movement detection unit, and changes the second virtual image such that changing the first virtual image operates to cause the second virtual image to change.

2. The vehicle display device according to claim 1, wherein when a movement of a part of the body bringing the second virtual image outside a display area is detected by the movement detection unit, the display unit performs display such that the first virtual image moves the second virtual image outside the display area.

3. The vehicle display device according to claim 1, wherein the display unit displays, based on route information from a navigation device, an arrow for route guidance to be superimposed on a route on the outside scene as the second virtual image, and then performs display such that the first virtual image moves a tip end of the arrow to change a direction of the arrow when a movement of a part of the body changing a direction of the tip end of the arrow is detected by the movement detection unit, and the vehicle display device further comprises a transmission unit configured to transmit an instruction for changing the route to the navigation device when the movement of a part of the body changing the direction of the tip end of the arrow is detected by the movement detection unit.

4. The vehicle display device according to claim 1, wherein the display unit displays the second virtual image on a building built at a pre-registered location on the outside scene or around the building, then when a movement of a part of the body operating to cause the second virtual image to change is detected by the movement detection unit, changes the second virtual image such that the first virtual image operates to cause the second virtual image to change, and then displays information on the pre-registered location on the outside scene.

5. The vehicle display device according to claim 1, wherein the display unit displays an icon corresponding to an electronic device as the second virtual image, then when a movement of a part of the body operating to cause the icon to change is detected by the movement detection unit, changes the icon such that the first virtual image operates to cause the icon to change and then displays an operation panel of the electronic device.

* * * * *